Aug. 9, 1960   A. I. ARNELO   2,948,848
FAULT DETECTING AND INDICATING SYSTEM
Filed June 27, 1956   2 Sheets-Sheet 2
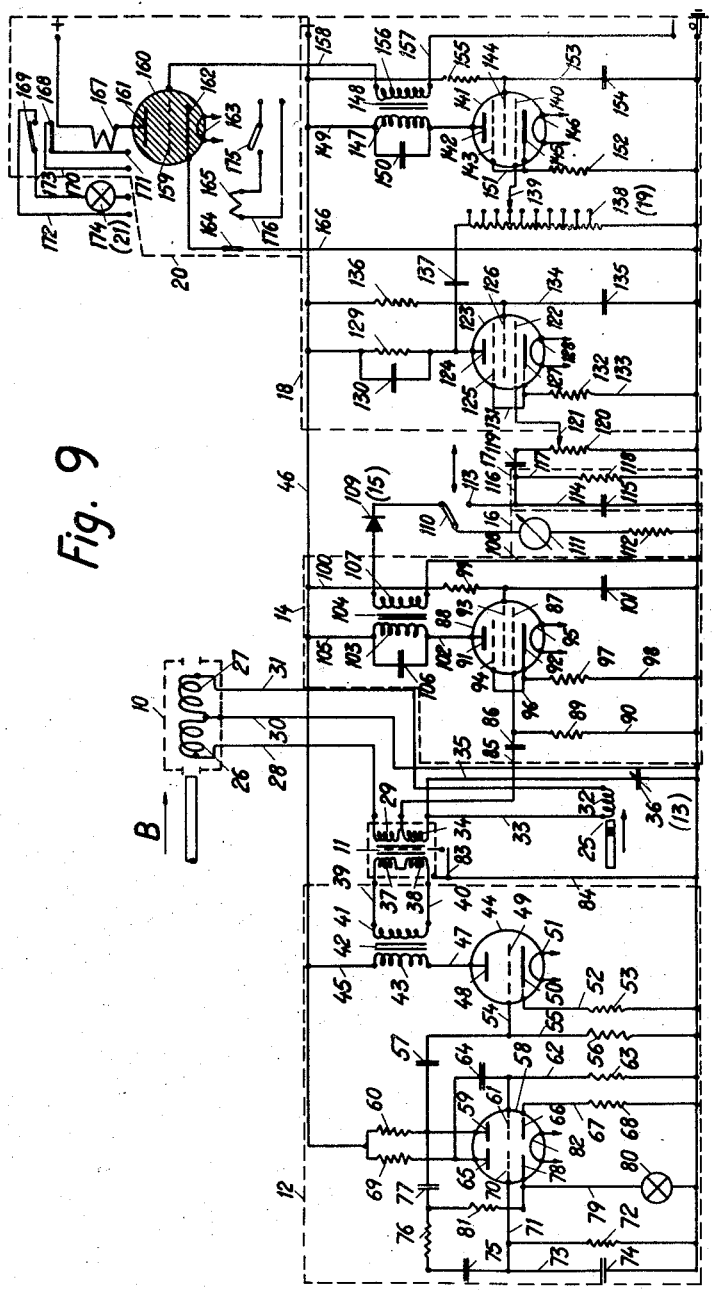

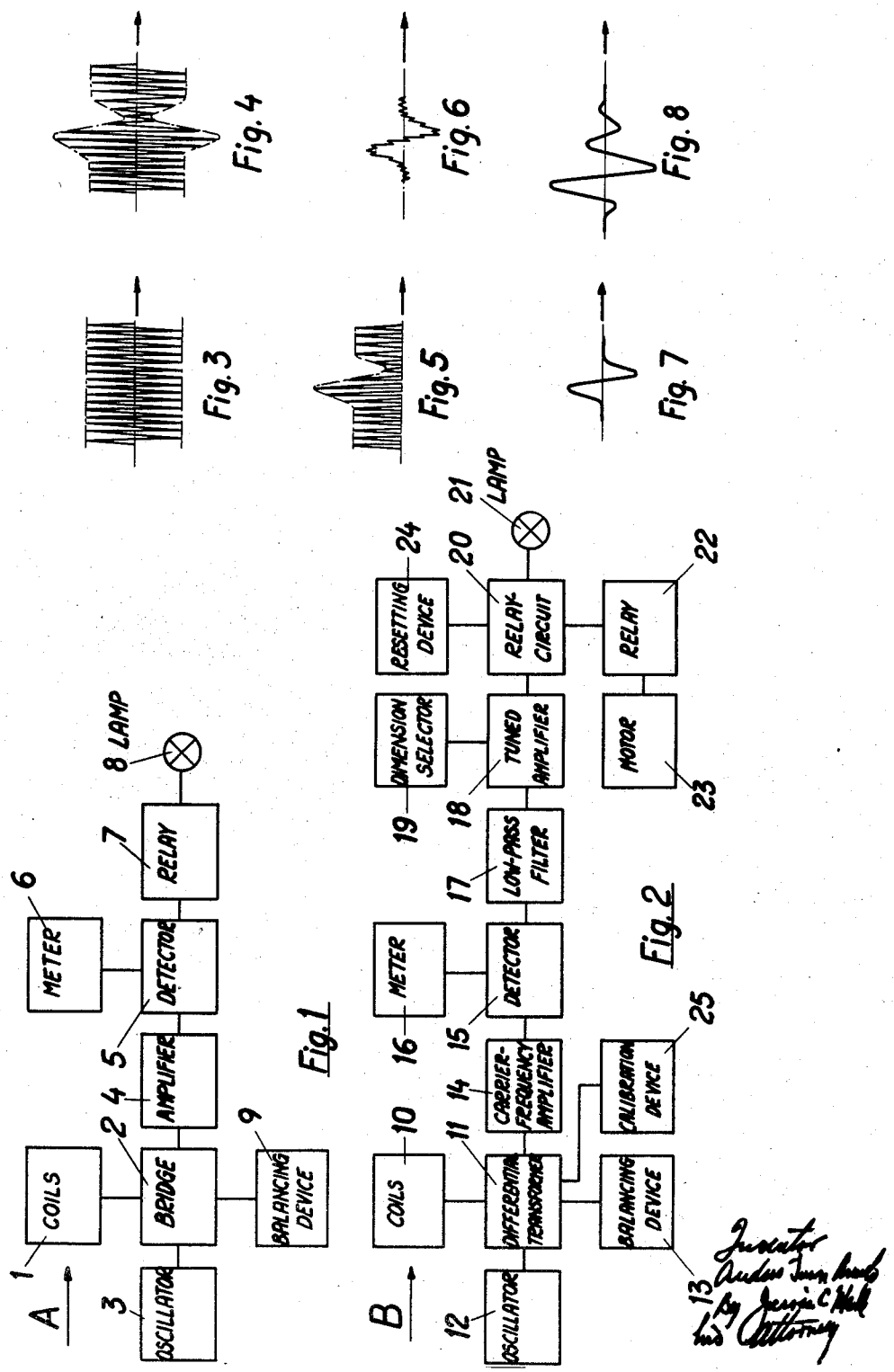

United States Patent Office 2,948,848
Patented Aug. 9, 1960

2,948,848

FAULT DETECTING AND INDICATING SYSTEM

Anders Ingvar Arnelo, Vasteras, Sweden, assignor to Aktiebolaget Svenska Metallverken, Vasteras, Sweden, a joint stock company limited Filed June 27, 1956, Ser. No. 594,169

Claims priority, application Sweden July 1, 1955

5 Claims. (Cl. 324—34)

The present invention relates to a method and means for the inductive automatic control of irregularities, such as surface faults, homogeneity faults, foreign inclusions and the like in positively advanced material, wherein the material is caused to pass through an electric solenoid arrangement supplied with alternating voltage of a predetermined frequency, which will generate a magnetic field in a feeding area for said material, and wherein metallic irregularities passing through said area will change the electric state and produce an impulse modulated upon the supplied alternating voltage, which impulse is indicated by an indicator instrument connected in the electric circuit of the solenoid arrangement, which instrument detects irregularities appearing in the material passing through said area.

In the technics it is frequently required in operation to provide for a continuous control upon metallic components in positively advanced products of various kinds and particularly in preparing wire for electric conductors. In addition thereto it is often required to provide for the control of ready block or strip-like products or semi-manufactured articles as well as rod-like material. The products to be controlled may also be constituted of non-metallic material, the control in such case being related to foreign metallic inclusions to be indicated, so that entirely perfect articles or at least products with faults, lying within predetermined, acceptable limits, are allowed to pass on and products having unallowable faults in such respect may be detected and obstructed in its feeding movement.

In the factory-scale manufacture of such articles the latter are very rapidly advanced and therefore steps have to be taken to provide for an automatic and continuous control of the articles discharged like chords or strings from automatic machines during manufacture and to render possible, when faults appear, to stop the machines, and to eliminate said faults before the manufacture is permitted to continue.

Although the invention is applicable to many fields of manufacture and products, it is particularly adaptable to the manufacture of metal wire for electric conductors, wherein it is of particular importance to ensure the control of faults, such as surface faults, homogeneity faults, foreign inclusions and the like involved on the positively advanced wire.

It was previously suggested in controlling wire to pass it through an induction coil arrangement, which is supplied via an electric bridge by alternating current of a certain frequency from an oscillator or the like. The unbalance voltage caused by the faults passing through said coil is then amplified in an amplifier and supplied to a special control instrument, having also connected thereto a relay circuit, actuating an indicator lamp, acoustic signal device or the like. In the said previous methods and means as a primary step a correct sample is inserted into the coil, and by means of a balancing device and said instrument the bridge is balanced in such a way as to obtain a zero indication on the instrument. After the sample is removed and in lieu thereof the wire to be controlled is passed through said coil and if a fault of the above kind exists therein in any area, an unbalance condition is caused in the bridge by changing the state of the coil arrangement, which unbalance condition will be indicated upon the instrument as well as on the indicator device, such as the lamp or other signal device.

However, it has proved in practice that such methods of control are sensitive to disturbances of various kinds in operation and require continuous watching. As is well known various kinds of disturbances from the network will appear, such as sparking in contactors, motors and the like, which due to the required high sensitiveness of the instrument result in wrong indications. Another ground for disturbances is involved in the manufacture of wire, since the temperature of the wire will increase while being drawn so that relatively high temperatures may be obtained in the finished wire. The coil arrangements are, however, sensitive to temperature and this fact will result in an adidtional unbalance in the bridge, which obviously causes a wrong indication.

Furthermore, arrangements of this type have adjusting members of various kinds, which on the one hand are difficult to operate and on the other hand require frequently repeated adjustments, which will lower the control capacity and, being directly adapted to the conditions of production, also the manufacture of the articles in question.

However, the above deficiencies are removed by the present invention, which is characterized substantially in that the alternating voltage supplied is merely utilized as a fundamental frequency which is modulated by the fault impulse, after which the fundamental frequency is separated and the fault impulse only is caused to actuate the indicator instrument.

The invention will now be explained more fully with reference to an embodiment of the same diagrammatically shown in the attached drawings and in connection therewith further characterizing features of the invention will be set forth.

Figure 1 is a schematic so called block diagram showing substantially the connections in control arrangements of the kind hitherto known.

Figure 2 shows a similar block diagram in a control arrangement according to the invention.

Figure 3 is a diagrammatic view of the appearance of the non-modulated fundamental frequency in association with Figure 2.

Figure 4 is a diagrammatic view of the same fundamental frequency voltage having a fault impulse modulated thereon.

Figure 5 is a view of the appearance of the fault impulse after rectifying.

Figure 6 illustrates the appearance of the fault impulse after rectifying and after filtering away the fundamental frequency according to Figure 3.

Figure 7 illustrates the fault impulse after rectifying.

Figure 8 shows the fault impulse before being supplied to a relay circuit.

Figure 9 is a detailed schematic diagram of the connections according to Figure 2.

With reference to the prior art system shown in Figure 1, reference numeral 1 designates a coil arrangement of an inductive type, through which a wire or the like is adapted to be inserted in the direction of the arrow A in order to be tested therein for faults of various kinds in an inductive way. The coil is connected over an electric bridge arrangement 2 to an oscillator 3, which supplies alternating voltage of a substantially predetermined frequency to said coil. Also connected to said bridge is an amplifier 4 of a conventional type and connected to the terminals of said amplifier is a detector designated by 5, which is connected in turn to an indicator instrument 6 over a relay circuit 7 to an indicator lamp, acoustic signal device or the like designated by 8. Additionally, designated by 9, is an electric balancing device connected to the bridge circuit 2 for the purpose of balancing the latter.

The arrangement shown in the figure substantially operates as follows: The alternating voltage supplied by the oscillator, via the bridge will result in a magnetic field in the coil. When a wire is passed through the latter, eddy currents are induced in the wire. If, for instance, the coil arrangement includes two coils and the inserted wire is correct the eddy currents in the wire are equally distributed and the electric state of both coils is kept constant. However, if a fault, e.g. a surface fault, foreign inclusion or the like, exists in the wire the distribution of eddy currents in the wire will be disturbed and this will influence the state of the coil, in which the fault exists so that the coils, in an electric aspect, are no longer equal but will result in an unbalance voltage from the bridge. Said unbalance voltage is supplied to the amplifier 4, in which it will be amplified to such an extent that it can be rectified and supplied to the instrument 6, which will take place over the detector 5. The detector then supplies a direct voltage to the relay circuit 7, which is proportional to the unbalance voltage in the bridge and the relay circuit in turn operates a signal device, e.g. the lamp 8.

In order to define a starting point for the control the instrument 6 is at first zeroized by means of a special balancing device connected to the bridge arrangement 2, which balancing device may be adjusted by means of one or a number of wheels when testing correct material in the coil arrangement 1. In such a device, with reference to the reasons earlier mentioned, a balancing control is frequently required, which is both time-consuming and troublesome and obviously retards the ordinary feeding of the manufactured material and at the same time continuous vigilance is required of persons trained for this work. This arrangement being shown in Figure 1 operates on so called amplitude indicating principles. It also has been suggested to use so called phase-indication, which offers certain possibilities of separating different faults from each other. However, with such arrangements, like troubles with sensitivity to different kinds of irrelevant disturbances are involved under operating conditions. This is also applicable to the balancing arrangement, which thereby has to be made considerably more complicated and additionally renders difficult the handling and watching.

However, in order to avoid the difficulties discussed above with known arrangements and methods, and in accordance with the invention as will be evident from the block diagram of Figure 2, a dynamic control may be employed, which means that the arrangement is made selective to a fault in the material advanced at a certain speed through the coil arrangement in contradistinction to the so called static control principle, being used in the known arrangement illustrated in Figure 1.

In Figure 2 reference numeral 10 designates a coil arrangement, 11 an electric bridge, 12 an oscillator and 13 a balancing arrangement. Furthermore, 14 designates a fundamental frequency amplifier, 15 a detector, 16 a control instrument, 17 a filter arrangement, 18 an amplifier tuned to the frequency of the fault impulse. Reference numeral 19 designates a special arrangement for adapting the sensitivity of the apparatus to different material sizes of material. Reference numeral 20 designates a relay circuit and 21 an indicator lamp or other signal device. Further, 22 designates a contactor, 23 a driving motor, 24 a restoring device for the actuation of the relay circuit. In order to provide for a dynamic control of the sensitivity of the apparatus there is provided a calibrating device 25 connected to the bridge.

The above described arrangement operates substantially in the following way:

Through the intermediary of the oscillator 12 an alternating voltage of a predetermined frequency, similar to the case of Figure 1, is supplied to the coil arrangement 10 over the bridge 11, giving rise to a magnetic field in the coil which will vary synchronously with the frequency of the alternating voltage.

If a work piece or as in the present case a wire is inserted in the coil arrangement 10 in the direction of the arrow B at a predetermined positive feeding rate, eddy currents are induced in the coil, the amount and distribution of which are determined by the appearance of the wire, its conductivity and faults of different kinds. The amount and distribution of the eddy currents will influence the electric state of the coil. If the coil arrangement comprises two coils connected in series and located in succession in the direction of feed of the wire, at the moment when a wire section having a fault therein is in one of said coils, the electric state of said last mentioned coil will change in relation to the state of the other coil, which will give rise to a change of the balance of the bridge. In contradistinction to the arrangement described with reference to Figure 1 in this case the bridge is adjusted before hand by means of the balancing device 13 so as to obtain a certain unbalance of the bridge circuit while using a correct sample placed in the coil 10. Thus, in this case no zero-balance of the bridge is normally employed in contradistinction to the case of Figure 1.

Thus, when a faulty sample is entered at a certain definite rate in the coil arrangement 10, this will result in an impulse-like change of the unbalance voltage in the form of an impulse modulated upon the unbalance voltage. The frequency of said impulse is defined by the width of the coils and by the velocity of the passing fault. The unbalance voltage modulated by the fault impulse, called fundamental frequency as the description proceeds, will now be supplied to an amplifier 14 tuned to the fundamental frequency and having a suitable band width and from thence to the detector 15 to be rectified. Now, in order to separate the fundamental frequency from the fault impulse the rectified voltage is supplied by the filter arrangement 17, which is adapted in such a way as to entirely allow the fault impulse to pass but, however, obstructs the fundamental frequency. The fault impulse, thus separated, is now supplied to the amplifier 18 tuned to the fault impulse, which amplifier serves to amplify the fault impulse to such a high extent as to enable the actuation of the relay circuit 20. This relay circuit is turn actuates the indicator arrangement, e.g. a lamp or acoustic signal device, which will become effective when a fault is passing through the coil arrangement. The relay circuit may also be arranged to guide the contactor 22, which will stop the driving motor 23 for the positive feeding of the wire if a fault is indicated. Furthermore the relay circuit may be connected to the restoring device 24, viz. a device for starting the apparatus again for control purposes after the driving motor has stopped operating. The tuned amplifier 18 may be actuated by means of a special diameter adjustment device for the wire in such a way that equal sensitivity will be obtained for wire sizes of different diameters.

The instrument 16 being connected to the detector serves for setting the unbalance level of the bridge. It is also possible by means of said instrument to control in a static way the position and magnitude according to the static method substantially as described in connection with Figure 1. When it is desired under operating conditions to secure the control of the sensitivity to the faults of the apparatus, it is provided with a calibrating arrangement 25, substantially comprising a coil as well as a testing rod which can be advanced at a certain velocity, which rod is moved through the coil at a rate corresponding to that of the wire. This occurs by means of a spring (not shown).

By the dynamic and selective characteristics of the arrangement according to Figure 2 those advantages are obtained that such sources of faults are removed, which may form disturbing impulses of longer or shorter duration than that impulse, which is caused by a fault passing through the coil arrangement, in which case, however, at the same time by a suitable design of the amplifier, which is tuned to the fault impulse, within a practically satisfactory range, a constant sensitivity is obtained when varying the velocity of feed of the wire.

With reference to Figures 3–8, Figure 3 illustrates the appearance of the fundamental frequency on the input as well as on the output side of the bridge if a correct material is passing through the coil arrangement 10. However, as soon as a faulty material is passing through the coil arrangement the fundamental frequency is modulated by the fault impulse and will have an appearance in accordance with Figure 4. As has been earlier referred to, the frequency of the fault impulse is determined by the width of the coil and the velocity of the fault passing through the coil. In designing the coil arrangement it is adapted substantially in such a way that the frequency of the fault impulse to a considerable degree will exceed the net-work frequency and its strongest harmonics in order to make the apparatus insensible to disturbances derived from the net-work. In order to provide for a good reproduction of the fault impulse the fundamental frequency should be preferably five to ten times greater than the frequency of the fault impulse. In accordance with the presumptions stated above, a curvature is obtained when a fault has passed through the coil arrangement, which corresponds to that indicated in Figure 4, at the input side of the fundamental frequency amplifier 14.

The modulated fundamental frequency, after having passed the detector 15, will have the appearance illustrated in Figure 5 and after passing through the filter arrangement 17 generally a curvature according to Figure 6 is obtained, it being then desirable to observe that the fundamental frequency has been filtered away.

After further amplifying in a stage not indicated in the amplifier the fault impulse will have the appearance of Figure 7. After further amplifying, the same curvature will have the appearance shown in Figure 8, the impulse being then allowed to actuate the relay circuit and the other desired circuits.

Figure 9 shows a detailed schematic view of the block diagram shown in Figure 2. The coil arrangement 10 comprises two successive closely spaced coils 26 and 27 connected in series. The coil 26 is connected via a line 28 to one secondary winding 29 of a screened and balanced transformer, which corresponds to the bridge 11 of Figure 2. The other end of the coil 26 is connected over a line 30 to earth. Furthermore, at its outer end the coil 27 is connected to the coil of the calibrating device over a line 31, said device having the numeral 25 in Figure 2. The coil 32 furthermore over a line 33 is connected to the other secondary line, designated by 34 in the screened and balanced transformer 11, which additionally, over a line 35 and an adjustable condenser, corresponding to the balancing 13 of Figure 2, is connected to earth. The coils 29 and 34 as well as associate lines thus represent a complete electric bridge supplied with alternating voltage over the primary side of the transformer 11 which comprises the windings 37 and 38. Both windings 37 and 38 are supplied over lines 39 and 40 from the secondary winding 41 of an output transformer 42 the primary winding of which is designated by 43 and constitutes the anode circuit of the tube 44. The tube 44 is supplied over lines 47, transformer winding 43 and lines 45 and 46, by anode potential from the positive pole of the source of anode potential. The anode of the tube 44 is referred to by 48, control grid by 49 and cathode by 50. The filament is referred to by 51.

The cathode 50 is connected over a line 52 via a cathode resistance 53 to earth. The anode current in the tube, over the resistance, supplies grid bias to the tube 44. The control grid is connected over lines 54 and 55 and the grid resistance 56 to earth and further via a connecting condenser 57 to the anode of the tube 59. The anode receives its anode potential over the anode resistance 60 and line 46. The control grid 61 is connected over a line 62 and the grid resistance 63 to earth and over a connecting condenser 64 to the anode 65 of the tube 58. The cathode 66 is connected over a line 67 and a cathode resistance 68 to earth. The anode 65 obtains its anode potential over the resistance 69 and line 46. The control grid 70 is connected over a line 71 via the grid resistance 72 to earth. Connected in parallel to the resistance 72 over a line 73 is a condenser 74. The cathode 78 is connected over line 79 to an automatically adjustable resistance over line 79, said resistance constituting a metal filament lamp 80, and then passed to earth. The control grid 70 is connected over the line 71, condenser 75, resistance 76 and condenser 77 to the anode 59. The resistance 81, being connected between the cathode 78 and the point of connection of the resistance 76 and condenser 77, serves as a connection in opposition circuit. Filament 82 is provided for the tube 58.

The screens 83 of the screened and balanced transformer 11 are passed to earth via line 84. The central point of the secondary winding of the transformer 11 is connected via a line 85 over the connecting condenser 86 to the control grid 87 of the tube 88. Also, the control grid 87 is connected over the grid resistance 89 and the line 90 to earth. The anode of the tube 88 is referred to as element 91, cathode by 92 and screening grid by 93. The suppressor grid is referred to as element 94 and filament as element 95. The suppressor grid 94 is connected over line 96 to the cathode and the latter in turn over the cathode resistance 97 and line 98 to earth. The screen grid 93 is supplied over the resistance 99 and lines 100 and 46 with screen grid potential and is furthermore connected to earth over the condenser 101. The anode 91 is connected over a line 102 to one side of the primary winding 103 of the transformer 104. Due to the fact that the other side of the primary winding 103 is connected over line 105 to the line 46, the tube 88 receives anode potential. The primary winding 103 has been tuned by connecting over it in parallel a condenser 106. The secondary winding of the transformer 104, referred to by 107, has one of its ends connected to earth over line 108. Its other end is connected over the diode 109 to the movable part of a change-over switch 110. One of the fixed contacts of the change-over switch 110 is connected to earth over the indicator instrument 111 and resistance 112. The other fixed contact of the change-over switch 110, referred to by 113, is connected to earth over line 114 and condenser 115. By means of a line 116 a resistance 118 is connected in parallel to the condenser 115. The contact 113 is further connected to earth over line 116, condenser 119 and potentiometer 120.

The movable contact 121 of the potentiometer 120 is connected to the control grid 122 of the tube 123. In this tube the anode is referred to by 124, suppressor grid by 125, screen grid by 126, cathode by 126 and filament by 128. The tube receives its anode potential over a resistance 129 and line 46. The anode resistance 129 is connected in parallel to a condenser 130 for short-circuiting higher frequencies. The suppressor grid 125 is connected via a line 131 to the cathode 127 and the latter in turn over a cathode resistance 132 and a line 133 connected to earth. The screen grid 126 is connected over line 134 to earth through the condenser 135 and receives its screen grid potential over the screen grid resistance 136 and line 46. The anode 124 is connected to earth over the connecting condenser 137 and the stepwise changeable potentiometer 138.

The movable contact 139 of the step-wise changeable potentiometer 138 is connected to the control grid 140 of the tube 141. In the tube 141 the anode is referred to by 142, suppressor grid by 143, screen grid by 144, cathode by 145 and filament by 146. The anode 142 obtains its anode potential over the primary winding 147 of the transformer 148, lines 149 and 46. The primary winding 147 is tuned by means of a parallel connection over it of a condenser designated by 150. The suppressor grid is connected by means of a line 151 to the cathode 145 and the latter in turn connected to earth over the cathode resistance 152. The screen grid 144 is connected to earth over the line 153 by the condenser 154 and obtains its screen grid potential over the screen grid resistance 155 and the line 46. The secondary winding of the transformer 148 is referred to by 156. One of its sides is connected by the line 157 to the negative pole of the source of potential not shown here. The other end of the secondary winding is connected by the line 158 to the control grid 159 of a gas-filled triode, viz. a thyratron tube, designated by 160. The anode of the triode 160 is referred to by 161, the cathode by 162 and filament by 163. The cathode 162 is connected over a relay contact series 164 to earth. The cathode 162 is connected via the relay contact series 164, actuated by the coil 165 of the relay over the line 166 to earth. The anode 161 is supplied via a relay coil 167 located in the anode circuit, with anode voltage from the positive pole of a source of voltage not shown. The relay coil 167 actuates the relay contact series 168 and 169. The relay contact series 168 is normally closed, as is shown in the figure, and may actuate over lines 170 and 171 a contactor not shown here, which is designated by 22 in Figure 2. The relay contact series 169, which normally is open, connects over lines 172 and 173 a signal lamp 174 to a source of voltage not shown. The relay coil 165 is connected over the terminal 175, designated by 24 in Figure 2, and the line 176 to a source of current not shown.

The filaments 51, 82, 95, 128, 146 and 163 are connected to a common source of voltage not shown.

The various circuits of the above described schematic chart substantially operate in the following way:

The tube 58 and associate components of connection serve as a generator of alternating voltage to be supplied to the bridge, referred to by 11 in Figure 2. The embodiment discloses a resistance-capacitance coupled oscillator but may alternatively use another coupling principle. The condenser 74 and resistance 72 and the condenser 75 and resistance 76, respectively, constitute the frequency determining circuits of the oscillator coupling. The triode halves 59, 61 and 66 and 65, 70 and 78, respectively, operate as resistance coupled amplifiers, the anode resistance of which is formed by the resistances 60 and 69, respectively. Serving as an A.C.-coupling member between the anode 65 and grid 61 is the condenser 64 while the condenser 77 serves as an A.C.-coupling element between the anode 59 and grid 70. By means of both said last mentioned couplings the two resistance coupled triode components are permitted to oscillate generating an alternating voltage, the frequency of which, as previously mentioned, is determined by the condenser 74, resistance 72 and condenser 75 and resistance 76, respectively. By introducing a connection in opposition to a certain part of the generated alternating voltage over the resistance 81 to the cathode, and due to the prevailing internal resistance relating to the voltage, a stabilizing of the frequency and amplitude of the alternating voltage generated is gained. The resistances 68 and 63, respectively, in the usual manner serve as cathode and grid resistances. The alternating voltage generated in the oscillator stage is impressed upon the controlling grid 54 of the tube 44 over the coupling condenser 57. The tube 44 and associate coupling elements serve as a transformer coupled output stage, the anode impedance of which is formed by the primary winding 43 of the transformer 43. The grid potential is generated by the anode current in the cathode resistance 53 and resistance 56 serves as a grid resistance. In the transformer 42 stepping down of the impedance occurs so that the secondary side will have a considerably lower impedance than has the primary side 43. This is all to obtain a good adaptation to the bridge circuit referred to by 11 in Figure 2. The tubes 54 and 58 together with the above described coupling elements in combination form the part designated by 12 in Figure 2. Over the secondary winding 41 of the transformer 42 an alternating voltage is obtained, coinciding with that diagrammatically shown in Figure 3.

The bridge designated by 11 in Figure 2 may be arranged in different ways with the same result. In the embodiment according to Figure 9 it constitutes a so-called differential transformer coupling, represented by the screened and balanced transformer, the primary winding of which is formed by the windings 37 and 38, secondary windings 29 and 34 and screens 83, which latter are connected to earth. The coil 26 of the coil arrangement is connected by a line 28 to one coil 29 of the secondary windings and the other coil 27 by the line 31 and the coil 32 designated by the numeral 25 in the calibrating arrangement of Figure 2 and the line 33 to the other winding 34 on the secondary side of the transformer. The inductance of the coil 32 is small as compared with that of the coil 27. Balancing of the bridge occurs by means of the adjustable condenser 36 designated by 13 in Figure 2. The alternating voltage generated in the oscillator and power amplified in the output stage and impressed upon the primary winding 37, 38 in the screened and balanced transformer results in two approximately like voltages over the two secondary windings 29 and 34 which in turn results in two approximately like voltages also over the coils 26 and 27 of the coil arrangement, whereby an alternating current will flow through said coils and the transformer windings 29 and 34.

When a metallic material, in this case a wire, is passing through or in the vicinity of said coils eddy currents are induced in the wire, the magnitude and distribution of which responds to the form of the wire, resistivity, homogeneity, foreign inclusions and surface irregularities of various kinds. Disturbing of any of the above conditions in the eddy currents will influence the coils changing their electric state. Upon setting the apparatus a correct wire is placed in the coils 26 and 27, after which balancing of the bridge circuit to a certain extent occurs by means of the adjustable condenser 36 so as to obtain over the condenser 86 over the control grid 87 of the tube 88 and earth an unbalance voltage coinciding in appearance with the configuration diagrammatically shown in Figure 3. If a faulty wire is being positively advanced through the coil arrangement at a certain speed, as a result of what has been described, the curvature at the entrance of the tube 88 at an instant when the fault is passing through the coil arrangement, will be altered so that the unbalance voltage will have a picture similar to that diagrammatically shown in Figure 4.

The calibrating arrangement 25, 32 principally operates in the same fashion as the coil arrangement 26, 27 and is employed to allow at different times the control of the sensitivity to faults of the apparatus. The testing material is here represented by a rod having a calibrated artificial fault which rod after release will be forced forwardly by a spring means through the coil 32 at a speed corresponding to that of the positive feeding, so that a modulated unbalance voltage, similar to that described above, may be obtained for controlling purposes.

The tube 88 with its coupling elements corresponds to the block designated by 14 in Figure 2 and serves as an amplifier for the unbalance voltage modulated by the fault impulse. The stage is a transformer coupled and tuned amplifier stage. The anode impedance is formed by the primary winding 103 of the transformer 104 tuned by the condenser 106. The circuit has such a Q-value that the modulated unbalance voltage may be amplified without being distorted. The screen grid voltage for the screen grid 93 is obtained over resistance 99 from the source of anode voltage, not shown, and connection to earth is by means of the condenser 101. Grid bias is generated by the anode current of the cathode resistance 97 and imparted to the grid over the grid resistance 89. The alternating voltage, modulated or not over the winding 103 is transmitted to the secondary winding 107, one end of which is connected to earth. With the change-over switch 110 in the position shown in Figure 9 a closed circuit is formed by the diode 109, instrument 111 and resistance 112, in which circuit after rectifying action of the diode 109 a non-flattened D.C. proportional to the alternating voltage supplied over the secondary winding 107, will flow through the circuit. The magnitude of this current is indicated by the indicator instrument 111, which, with the change-over switch in this position, will assist in adjusting the degree of balancing of the bridge by means of the adjustable condenser 36 and additionally renders possible at slow feeding of material through the coil arrangement 26, 27 to indicate faults in a static way. With continuous automatic control of positively advanced material the movable part of the change-over switch 110 is in contact with the fixed contact 113. The diode 109 and indicator instrument 111 are designated by 15 and 16, respectively, in Figure 2.

After having passed through the rectifier 109 the unbalance voltage modulated by a fault is transformed so as to obtain a curvature similar to that shown in Figure 5. After filtering in the circuit, comprising the condensers 115 and 119 and resistance 118 as well as the potentiometer 120, the fundamental frequency is filtered off so as to obtain an impulse similar to that diagrammatically shown in Figure 6 to be impressed upon the control grid 122 of the tube 123. The tube 123 with its coupling elements forms a resistance coupled amplifier stage which receives its anode voltage over the resistance 129 from the source of voltage not shown. The resistance 129 serves as an anode impedance. The condenser 130 connected in parallel over the resistance 129 has a capacitance such that the condenser will short circuit the fundamental frequency voltage, which will result in a further filtering of it. The screen grid 126, over the resistance 136, receives its screen grid voltage from the source of voltage not shown and is connected to earth by means of the condenser 135. Grid bias is generated by the anode current over the cathode resistance, which bias is imparted to the control grid over the potentiometer 120, by means of which the sensitivity to faults of the apparatus may be adjusted.

The amplified fault impulse, the form of which corresponds to that of Figure 7, is supplied over the condenser 137 to the step-wise adjustable potentiometer 138 which operates as a voltage distributor for the impulse and by means of which it is possible to adjust the sensitivity in such a way that a constant sensitivity is obtained for the coupling for different dimensions of the positively advanced material.

The fault impulse, over the movable contact 139, is supplied to the control grid 140 of the tube 141, the anode of which receives its anode voltage over the primary winding 147 of the transformer 148 from the source of voltage not shown. The tube 141 and its coupling elements serve as a transformer coupled, tuned amplifier stage. The anode impedance of the tube 141 is established by the primary winding 147 of the transformer 148 tuned by means of its shunting condenser 150. The Q-value of the tuned circuit is adapted in such a way that variations of the positive velocity of feeding is permitted without any appreciable alteration of the amplification of the amplifier stage. In other words the circuit has a broad band width. The screen grid obtains its screen grid voltage over the resistance 155 from the source of voltage, not shown, and is connected to earth by the condenser 154. The anode current produces grid bias over the cathode resistance 152, which is impressed upon the step-wise adjustable potentiometer 138.

The step-wise adjustable potentiometer 138 corresponds to the block 19 of Figure 2, whereas both tubes 123 and 141 and associated coupling elements are referred to by 18 in the same figure.

The impulse being amplified in the tube 141 is transmitted from the primary winding 147 to the secondary winding 156 and then has a picture corresponding to that diagrammatically shown in Figure 8, which over the line 158 is impressed upon the control grid 159 of the gas-filled triode 160, which by means of a negative voltage, from a source of voltage not shown, over the lines 157, transformer winding 156 and line 158, has been impressed upon the control grid 159, is kept extinguished when no fault impulse has entered. When the gas-filled triode is extinguished no current will flow through it, and therefore the relay contact groups 168 and 169 are in the positions shown in Figure 9. The relay contact groups 168 and 169 are influenced by the relay coil 167, which is connected with one of its ends to the anode of tube 160 and with the other end to a source of voltage not shown. As shown in Figure 9 the relay contact group is normally closed and connects over the line 166 the cathode to earth. The lamp is normally extinguished and the contact 175 is normally open.

The gas-filled triode 160 and associate coupling members are designated by 20 in Figure 2 and the contact 175 by 24. The lamp 174 is designated by 21 in Figure 2. The relay contact group 168, via the lines 170 and 171, serve as a locking contact for a contactor not shown here, which is referred to by 22 in Figure 2, and this one in turn actuates an operating motor for the positive feeding of the material referred to by 23 in Figure 2.

When a fault in the positively advanced material, exceeding the allowance set, is passed through the coil arrangement, in accordance with the preceding description, a voltage impulse of such a magnitude is impressed upon the control grid 159 of the gas-filled triode 160 that the tube 160 is ignited and an anode current starts to flow through it. The relay coil 167 is actuated by said current which results in the contact 168 being opened and the contact 169 closed, so that the operating motor 23 in Figure 2 is stopped and the lamp 174, referred to by 21 in Figure 2, is ignited respectively, indicating a fault in the positively advanced material. After removal of the fault and the gas-filled triode has been extinguished, which occurs by the contact 175 being closed, the relay may be attracted and the relay contact group 164 opened. The positive feed continues after starting the operating motor 23. The terminal 175 may be located in any place in the automatic machine and may also be doubled.

The invention is not limited to the embodiment shown and described but may be varied in several respects within the scope of the basic inventive idea.

Having now described the invention, what I claim as new and desire to secure by Letters Patent, is:

1. An arrangement for detecting and indicating a particularly undesired fault, such as a surface irregularity, a homogeneity defect, a foreign inclusion or the like in a material positively advanced at a predetermined velocity, including an electrical bridge circuit having a pair of branches, said bridge circuit having a solenoid included in one branch and adapted to receive said material, means for supplying an alternating voltage of a predetermined frequency to the other branch of said bridge whereby the output of said bridge is adapted to contain the predetermined frequency as a fundamental or carrier frequency and a fault impulse frequency modulating said fundamental frequency being impressed thereon as the magnetic state of said solenoid is altered by the defects in the material advanced therethrough, a carrier frequency amplifier connected to the output of said bridge, detecting means for rectifying the amplified voltage of said bridge, a low pass filter adapted to filter out said fundamental frequency and to pass the low, fault impulse frequencies impressed thereon, a tuned amplifier circuit connected to said low-pass filter and adapted to be resonant to one of the low, fault impulse frequencies passed by said low-pass filter and an indicator responsive to the output of said tuned amplifier circuit and adapted to yield an indication of the fault frequency selectively passed thereby.

2. An arrangement as claimed in claim 1 wherein said tuned amplifier circuit includes a grid controlled tube and there is provided a step potentiometer in control of said tube whereby said tuned amplifier circuit will be responsive only to fault impulse frequencies of a selected amplitude and above.

3. An arrangement as claimed in claim 2 wherein an adjustable impedance element is inserted in one of the branches of said bridge, said element being adapted to maintain said bridge in a slightly unbalanced condition so as to insure a continuous bridge output at said fundamental frequency.

4. An arrangement as claimed in claim 3 wherein said adjustable impedance element is a variable capacitor.

5. An arrangement as claimed in claim 4 wherein a calibrating coil unit is inserted in said other branch of said bridge for controlling the sensitivity of the bridge network to the unwanted fault.

References Cited in the file of this patent

UNITED STATES PATENTS

| Re. 21,003 | Knerr et al. | Feb. 14, 1939 |
| 2,415,789 | Farrow | Feb. 11, 1947 |
| 2,513,745 | Reynolds | July 4, 1950 |

OTHER REFERENCES

Journal of Scientific Instruments, volume 20, September 1943, page 147, article by O'Dell.